March 4, 1969  G. SATZINGER  3,430,731
LUBRICATOR

Filed Aug. 4, 1965  Sheet 1 of 2

INVENTOR
Gebhard SATZINGER
ATTORNEYS

United States Patent Office 3,430,731
Patented Mar. 4, 1969

3,430,731
LUBRICATOR
Gebhard Satzinger, Bad Kissingen, Germany, assignor to Gebhard Satzinger Metallwarenfabrik, Bad Kissingen, Germany, a corporation of Germany
Filed Aug. 4, 1965, Ser. No. 477,223
U.S. Cl. 184—39                                             12 Claims
Int. Cl. F16n 5/00; B67d 5/44; G01f 13/00

ABSTRACT OF THE DISCLOSURE

A lubricator apparatus which forcibly dispenses lubricant from a supply container by the volumetric displacement action of a bag-like expandable member enclosed within the container and which contains an electrolyte. Bag volume is increased by the internal pressure of gases generated by the reaction between the electrolyte and a galvanic element in contact therewith.

---

This invention relates in general to lubricating devices, or lubricators which are used for supplying lubricants such as grease to bearings.

The lubricator of the instant invention provides a lubricant supply container including an outlet for dispensing lubricant therefrom and for connection with a lubricant fitting associated with the bearing to be lubricated, and an expandable member disposed within the container for volumetric expansion therein to expel lubricant through the outlet thereof to supply such bearing or bearings. The volumetric expansion effected by the expandable member is accomplished by means of an internal gas pressure. This gas pressure is obtained by galvanic means disposed for introduction into the expandable member to react with an electrolyte therein and generate gas.

This invention is generally applicable to the lubrication of various types of bearings, such as for example roller bearings, friction or journal bearings and the like.

Hitherto, bearings in engines and other machinery were lubricated merely by being greased thoroughly by means of a grease gun or by a grease box attached to a lubricant fitting, such lubrication being performed at periodic intervals based upon the experienced lubricant needs of the particular bearings involved. However, such periodic lubrication was in general not satisfactory, under varying conditions of lubricant consumption, and since such prior art lubrication practice did not provide for automatic supplying of lubricant to replace that which had been consumed, the periodic lubrication provided had to suffice until additional lubricant was applied.

While in general, grease cups or lubricators are known in the prior art which are operated by means of compressed gas such as air, or by means of a gas generating cartridge, such devices have not been entirely satisfactory. If the air or gas pressure, which is used to force the lubricant through the fitting and up to the intended bearing lubrication zone, is greater than the resistance to lubricant flow presented by such fitting and lubricant passages, the lubricator will empty rapidly and in a short time the benefit to be obtained by lubricating with a pressurized lubricant supply will be lost. If the pressure acting to supply lubricant to a bearing is less than the flow resistance presented by the supply passages, then no actual lubrication can take place. Hence, it is necessary for satisfactory lubrication that the pressure acting to supply lubricant be slightly above that needed to overcome flow resistance so as to effect a suitable lubricant delivery rate and to maintain such delivery rate over an extended period of time until the lubricant supply is exhausted, taking into account the flow resistance and the viscosity of the lubricant.

In certain prior art lubricators utilizing gas generating cartridges, there was the problem of obtaining satisfactory lubrication because of variations in resistance to lubricant flow among different lubricant fittings and passages.

This difficulty is traceable to the safety valves provided in such lubricators for releasing the excess pressure of the gas generator. For satisfactory performance in such lubricators, the safety valve would have to be capable of operating in response to the flow resistance encountered by the lubricant dispensed therefrom in order to assure that lubricant would arrive at the intended greasing point. Such an adjustable safety valve feature, of course for practical reasons, was not provided.

The present invention provides a lubricator which is relatively unaffected in operation by variations in ambient temperature, and which can be adapted to dispense lubricant at a predetermined flow rate until its supply thereof is exhausted.

The lubricator of the invention, by reason of its pressurizing gas generating means, is capable of maintaining a relatively constant lubricant dispensing rate, and is self-adapting to variations in the flow resistance encountered, so as to assure an adequate lubricant supply to slackened bearings as well as to grease channels and bearing points which are difficult to penetrate.

According to the invention, the lubricator which accomplishes automatic lubricant dispensing, has a lubricant supply container including an outlet for dispensing lubricant therefrom, an expandable member disposed within said container for volumetric expansion therein to expel lubricant through the outlet thereof, an electrolyte disposed within said expandable member, and galvanic means disposed for introduction into said expandable member to react with the electrolyte therein and generate a gas whereby the internal pressure of such gas expands the volume of the expandable member and thereby results in the expulsion of lubricant from the outlet of the container.

The lubricant supply container is preferably constructed of a material having a thermal coefficient of expansion selected in relation to the volumetric coefficient of thermal expansion of the lubricant contained therein so that the internal pressure of the lubricant within the container is substantially unaffected by ambient temperature changes.

The galvanic means includes one or more galvanic elements, each galvanic element comprising a pair of dissimilar materials, preferably metals, which are conductively connected to each other and function as negative and positive electrodes respectively. As soon as a galvanic element is brought into contact with the electrolyte within the expansion member, a gas generating reaction results. The pressure resulting from gas generation causes the expansion member to increase in volume and act against the lubricant within the container to force said lubricant through the outlet and into the bearing point to be lubricated.

Assuming that an appropriate quantity of electrolyte is provided in proportion to the weight of the galvanic element, this gas generation, which takes place at the positive electrode, can last for several months until the negative electrode is completely exhausted. To assure against the escape of gas, and/or electrolyte, the expansion member is tightly sealed. Otherwise, there would be a loss of gas pressure which would render the lubricator ineffective for further operation, as well as the possibility of electrolyte contamination of the lubricant.

This particular gas generating method is especially advantageous in that where flow resistance is encountered, the gas pressure in the expansion member acting on the lubricant builds up to the level required to effect lubricant flow to the bearing point. Thus, the internal pressure within the expansion member automatically adjusts itself to the greasing pressure required to effect lubricant dispensing, and remains substantially constant at such pressure until the lubricant supply within the container is used up.

The invention further provides reliable means for bringing the galvanic element into contact with the electrolyte when it is desired to initiate automatic lubrication, and for maintaining the galvanic element out of reactive contact with the electrolyte until such contact is desired.

Such means are preferably provided in the form of a sealable housing for enclosing the galvanic element and externally operable screw means disposed in operative engagement with said housing for selectively sealing same to inhibit gas generating reactive contact between the galvanic element and the electrolyte, and to position the galvanic element for gas generating reactive contact with the electrolyte when desired.

Depending upon whether it is desired to provide an irrevocable type of gas generating operation, or whether it is desired to provide for selectively initiating and terminating the gas generation at will, the screw means which effects the introduction of the galvanic element into the electrolyte can be constructed so as to eject said element into the electrolyte, as for example irrevocable gas generation is desired, or alternatively the screw means can be provided with a reseatable sealing member and the galvanic element can be connected to the screw means for withdrawal back into the housing. In the case of the latter, the housing is preferably constructed with a bore for receiving the galvanic element upon the screw means, with a sealing washer being affixed to the free end of the screw for sealing and opening the housing bore. When it is desired to inhibit, or to terminate gas generation, the screw is retracted so as to draw the galvanic element into the bore and the washer into sealing engagement against the open end thereof. Initially, i.e., before the first introduction of the galvanic element into contact with the electrolyte, the galvanic element will be sealed dry within the bore, and hence will not react with the electrolyte. Once the galvanic element has been displaced out of the bore into contact with the electrolyte, some electrolyte will ordinarily be trapped within the bore upon retraction of the galvanic element by the screw, even though the bore is sealed by the washer. Thus, there will be a relatively small quantity of gas generated by the reaction of the trapped electrolyte with the galvanic element. However, due to the sealing action of the washer, this additional gas will not escape to increase the effective volume of the expansion member, and hence will not affect lubricant dispensing until such time as the screw is again advanced to bring the galvanic element into contact with the electrolyte.

By appropriately regulating the exposure time of the galvanic element to the electrolyte, as for example by the positioning screw means, the generated gas pressure and hence the volume of the expansion member can be correspondingly regulated to effect a selected lubricant dispensing rate.

Where it is desired to provide an irrevocable gas generation, the same basic type of sealable housing can be used, but the screw means is not connected to either the washer or the galvanic element, but rather is disposed in threaded engagement with the housing so as to be extendable into the bore for pushing both the washer and the galvanic element out into the electrolyte. In this case, the washer can actually be a plug which is inserted into the open end of the housing bore after the galvanic element is inserted during assembly of the lubricator. If desired, the galvanic element can be placed within the housing bore between two sealing washers, and the screw can be arranged to push against the rear washer as when the forward washer and galvanic element are to be ejected.

This concept can be further extended to provide a lubricator having a plurality of galvanic elements which can be selectively ejected in succession into the electrolyte for the purpose of obtaining a stepwise controllable type of gas generation. In such an arrangement, the galvanic elements are stacked one behind the other within the housing bore, and a slidable sealing washer is provided between successively adjacent galvanic elements, as well as at the forward open end of the bore. Of course, a correspondingly longer screw and housing bore are necessary, and is contemplated by the invention since the screw in order to push all of the galvanic elements out of the housing bore, will have to be capable of a net axial displacement corresponding to the total stacked length of the galvanic elements and intermediate sealing washers.

In the event that it is not desired to utilize such a stacked galvanic element arrangement, a plurality of single galvanic element housings can be substituted, along with their corresponding screw means so that the individual galvanic elements can be ejected as desired into the electrolyte to speed up the lubricant dispensing rate.

To assure a substantially uniform rate of gas generation, the galvanic element is preferably shaped in such a manner that its positive electrode has a uniform surface area exposed to the electrolyte during reaction therewith. This can be accomplished by constructing the negative electrode in the form of an S-shaped member and the positive electrode in the form of a rod attached to the central portion of the negative electrode with its two ends projecting slightly beyond the ends of the negative electrode.

For economy in manufacture, the lubricator of the instant invention can be preferably embodied in the form of a replaceable cartridge that can be inserted into a supporting housing flow connected with a lubricant fitting. Such a cartridge is preferably constructed in the form of cylindrical cup-shaped liner which can be sealed at one end with a discardable cover such as paper, etc., to maintain the lubricant in a clean condition prior to use. This cover is removed when the cartridge is inserted into the housing so as to permit the lubricant to flow through the outlet thereof. In this way, it becomes possible to dispense with providing a lubricant fitting coupling on the cartridge, since such is already provided on the support housing.

Within each cartridge, the entire gas generating system including the expansion member, electrolyte, galvanic element, and the means for introducing the galvanic element into the electrolyte are provided so that the cartridge can operate as a replaceable unit within its associated support housing.

It is therefore, an object of the invention to provide a lubricator which can be connected to a lubricant receiving fitting for automatic pressurized lubricant dispensing.

Another object of the invention is to provide a lubricator as aforesaid which is relatively unaffected by ambient temperature changes.

A further object of the invention is to provide a lubricator as aforesaid which is capable of reliable lubricant dispensing until its supply of lubricant is exhausted.

Another object of the invention is to provide a lubricator as aforesaid which is capable of self-adaption to variations in lubricant flow resistance so as to provide a substantially uniform lubricant dispensing rate.

A further object of the invention is to provide a lubricator as aforesaid wherein the dispensing of lubricant can be selectively initiated and terminated.

A further object of the invention is to provide a lubricator as aforesaid wherein the dispensing of lubricant can be be adjustably varied.

Still another and further object of the invention is to provide a lubricator as aforesaid in the form of a replaceable cartridge having self-contained pressurizing means.

Other and further objects and advantages of the invention will become apparent from the following detailed description and accompanying drawing in which.

Figure 1:
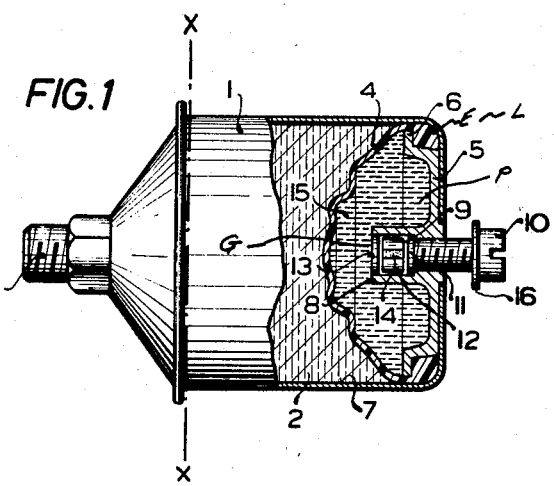
FIG. 1 is a side view, partly in section, of a lubricator constructed in accordance with one embodiment of the invention.

Referring now to the drawing, FIG. 1 shows a lubricator L which can be used for automatically supplying a lubricant such as a thick, viscose grease, etc., to roller bearings, journal bearings, friction bearings and similar machine parts requiring lubrication. The lubricator L can be replaced as a unit when its lubricant supply is exhausted, and for such purpose, said lubricator L is provided with a lubricant supply container 1 for holding a supply of lubricant 2, and a threaded outlet 3 for dispensing the lubricant 2 therefrom. To use the lubricator L, the threaded outlet 3 is operatively connected to a grease fitting (not shown) associated with the bearing or other element to be lubricated and the self-contained gas generating pressurization system P disposed with a container 1 is activated to force the lubricant 2 out through said outlet 3.

The gas pressurization system P includes an expandable member 4 disposed within the container 1 for volumetric expansion therein to expel the lubricant 2. The expandable member 4 is expediently constructed as a flexible and/or stretchable membrane or bag so as to define an enclosed region within the container 1. To increase the effective volume of the region enclosed by the expandable member 4, a gas is generated therein by the reaction between a galvanic element G and an electrolyte 15. To confine the gas thus generated to the region enclosed by the expandable member 4, the rear end of the container 1 is closed by a cover cap 5 having an inner peripheral lip 6 disposed in continuous sealing engagement with a corresponding outer peripheral edge portion E of the expandable member 4. The edge portion E lies adjacent to the inside wall surface 7 of the container 1 with a tight press fit between the lip 6 and said wall 7.

Although the expansion member 4 and its associated gas generating system P can be arranged in any suitable relation with respect to the lubricant supply 2 to accomplish the lubricant dispensing purposes of the invention, provided that the outlet 3 does not become blocked by expansion of the member 4 until the supply of lubricant 2 is exhausted, it is preferable for economy and simplicity of manufacturing to place the lubricant supply 2 within the forward portion of the container 1 and the expansion member 4 and gas generating system P in the remaining rearward portion thereof.

On the inside of the cover cap 5, there is attached a sealable housing 8 having a cylindrical bore 9 wherein the galvanic element G, or a plurality of such elements G, are enclosed and thus stored out of reactive contact with the electrolyte 15 during such times when gas generation is not desired. A screw 10, which is operable externally, is disposed for extension into the bore 9 to operatively engage the galvanic element G and selectively introduce same into reactive contact with the electrolyte 15 to generate gas for lubricant 2 dispensing action. In the bore 9, there is disposed adjacent to the screw 10 an inner sealing washer 11 and an outer sealing washer 13 which serve for keeping the electrolyte 15 out of reactive contact with the galvanic element G.

The galvanic element G comprises a pair of dissimilar material elements conductively connected to each other to define a negative electrode 12 and a positive electrode 14. The positive electrode 14 is arranged in the center of the negative electrode 12 in such a way that merely the two ends of each project outward. The positive electrode 14 is metallically and conductively connected to the negative electrode 12 which is S-shaped so that in any position gas generation can take place at the free ends of the positive electrode 14.

When the lubricator L is to be brought into operation, the screw 10 is screwed into the bore for positioning the galvanic element G into contact with the electrolyte 15. The inner washer 11 which is disposed adjacent to the screw 10, is pushed forward within the bore and seals same to prevent leakage of electrolyte 15 and/or pressurized gas past the threads of the screw 10. A packing seal 16 disposed around the screw 10 adjacent to the head portion thereof provides additional sealing to prevent leakage of electrolyte and/or gas through the cover cap 5.

Figure 2:
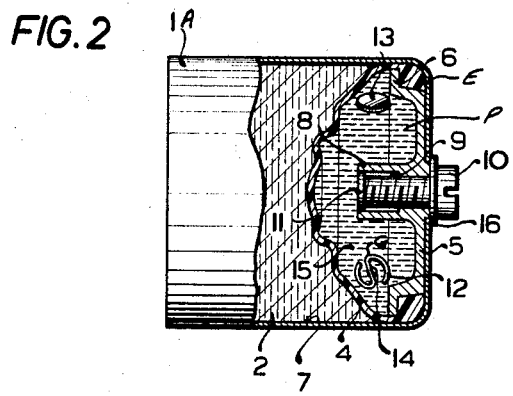
FIG. 2 is a side view, partly in section, of a cartridge lubricator constructed in accordance with a preferred embodiment of the invention.
Figure 3:
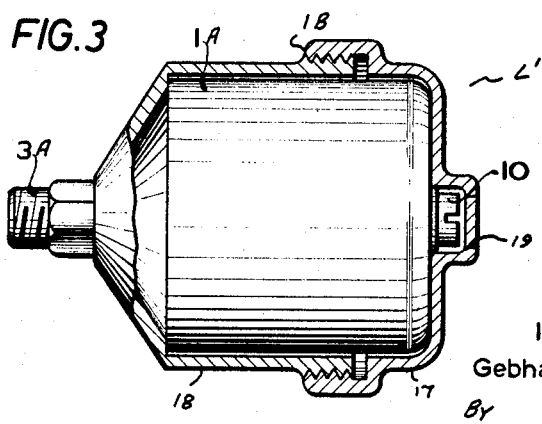
FIG. 3 is a side view, partly in section, of a lubricator assembly adapted for use with the lubricator cartridge of FIG. 2, showing the lubricator cartridge as installed therein.
Figure 4:
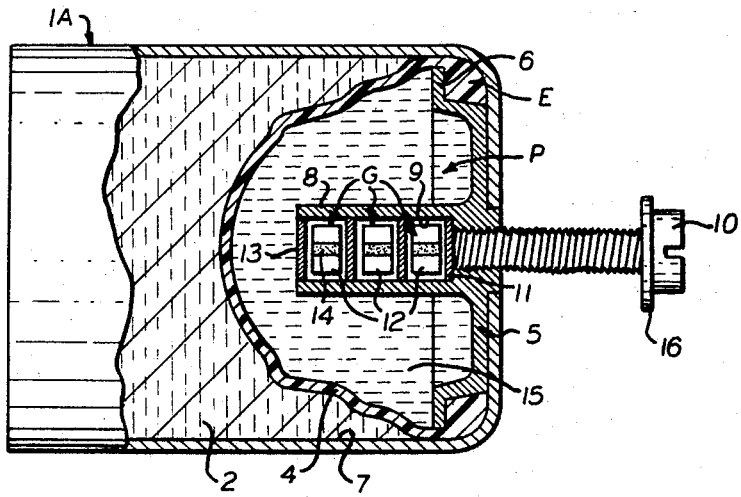
FIG. 4 is a side view, partly in section, of another embodiment of the invention.
Figure 5:
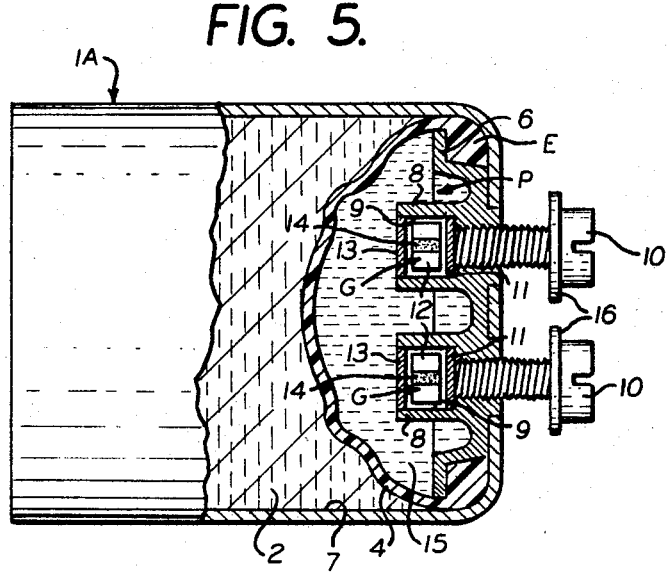
FIG. 5 is a side view, partly in section of yet another embodiment of the invention.

FIG. 2 illustrates a replaceable lubricant supply cartridge 1A for use in the lubricator L' of FIG. 3. The lubricator L' features a two-piece support housing 1B for enclosing the cartridge 1A and said housing 1B is also provided with a lubricant dispensing outlet 3A, similar to the outlet 3 of the lubricator L. In this way, the construction of the cartridge 1A is somewhat simplified, as it is not necessary to provide a permanent cover (not shown) at the forward end of said cartridge 1A. For example, the forward end of the cartridge 1A can be provided with a removable paper cover (not shown) that will keep the lubricant 2 clean until ready for use.

To place the lubricator L' in condition for operation, the end cap 17 is unscrewed, the cartridge 1A is inserted into the forward body portion 18 of the housing 1B, and the cap 17 is then replaced. The screw 10 is turned inward to eject the galvanic element G into the electrolyte 15 and thereby initiate the gas generation which effects lubricant 2 dispensing.

The lubricant cartridge 1A, which is constructed to functionally replace that portion of the lubricator L which lies to the right of the line X—X in FIG. 1 is activated for gas generation in substantially the same manner as the lubricator L. However, for purposes of example, the cartridge 1A is shown as having an irrevocable type of gas generating system P wherein the galvanic element G is ejected into the electrolyte 15 by the action of the screw 10 and cannot be retrieved again within the housing 8.

The broken away portion of the cartridge 1A in FIG. 2 represents a typical initial operating condition where the galvanic element G and the outer washer 13 have just been ejected into the electrolyte 15 by the screw 10. It is to be understood however, that under normal operating conditions, the galvanic element G is only introduced into reactive contact with the electrolyte 15 when the cartridge 1A is enclosed within the support in housing 1B as in FIG. 3. Otherwise, the lubricant supply 2 would be rapidly lost through the open forward end of the cartridge shell 7.

For this purpose, a suitable aperture 19 is provided in the cap 17 to permit the insertion of a screwdriver (not shown) for turning the screw 10 when the cartridge 1A is installed within the support housing 1B.

Within the scope of the invention, the gas generating system P can be either an irrevocable type whereby gas generation once initiated cannot be terminated until the galvanic element G or the electrolyte 15 is exhausted, or the gas generating system P can be of a continuously controllable type whereby the galvanic element G can be selectively introduced and withdrawn from reactive contact with the electrolyte 15 to controllably vary the gas pressure and hence the effective volume within the expandable member 4 to achieve a desired lubricant 2 dispensing rate.

For example, by connecting the galvanic element G and outer washer 13 to the screw 10 so that said galvanic element G can be moved into reactive contact with the electrolyte 15 by turning in the screw 10 and withdrawn from such contact by turning such screw 10 outwardly, the gas generating reaction can be controlled manually. Of course, once the galvanic element G is introduced into the electrolyte 15, some electrolyte 15 will be trapped within the bore 9 between the washers 11 and 13 when the galvanic element G is subsequently withdrawn, but such a limited quantity of trapped electrolyte 15 will not seriously impair gas generating reaction control.

Some degree of gas generating reaction control can be achieved even with an irrevocable type of gas generating system P, simply by providing a plurality of galvanic elements G which are stacked successively one behind the other within the bore 9, with adjacent galvanic elements G being separated by sealing washers (not shown). In this way, the screw 10 can be turned inward to eject the individual galvanic elements G one at a time in succession into the electrolyte 15.

Such an arrangement permits a stepwise control of gas generation within the expandable member 4, in that the individual galvanic elements G are maintained out of contact with the electrolyte 15 until ejected thereinto by the screw 10.

Alternatively, the same type of stepwise gas generation control can be achieved in an irrevocable gas generating system P by providing a plurality of individual housings 8, each containing a single galvanic element G, with each housing 8 being also provided with its own externally operable screw means 10.

Lubricators L and lubricator supply cartridges 1A can be constructed in accordance with the invention to provide various desired lubricant 2 capacities. In general, lubricators L and cartridges 1A of greater lubricant 2 capacity will require gas generating systems P of correspondingly greater capacity. Consequently, the dimensions of the housings 8 and bores 9 are necessarily adapted to the requirements of individual applications. For example, when a plurality of galvanic elements G stacked within a single housing 8 are to be provided, the housing 8 and its bore 9 will be correspondingly longer, to permit such galvanic elements G to be arranged one behind the other in the bore 9. Likewise, the length of the screw 10 must be sufficient in such case to accomplish the ejection of all such galvanic elements G and their intermediate sealing washers (not shown).

By using a gas generating system P with a plurality of housing 8 each containing a single galvanic element G, shorter screws 10, as well as shorter housing 8 lengths, can be realized, since in such case a relatively shorter screw 10 displacement is required to eject a single galvanic element G. In such an arrangement, the individual housings 8 are preferably mounted to or integrally constructed with the cover cap 5 for support thereby.

Since it is desirable that the expansion member 4 be capable of expanding to dispense the entire lubricant 2 contents of the container 1 or cartridge 1A, the quantity and concentration of the electrolyte 15, which is preferably a liquid electrolyte 15, is selected in relation to the total effective mass of the galvanic element G or elements G, so that a sufficient quantity of gas will be generated to effect the required volumetric expansion, taking into account the gas pressure required. As will be appreciated by those skilled in the art, these relative quantities can be readily determined by standard stoichiometric calculations.

What is claimed is:

1. A lubricator which comprises a lubricant supply container including an outlet for dispensing lubricant therefrom, an expandable member disposed within said container for volumetric expansion therein to expel lubricant through the outlet thereof, an electrolyte disposed within said expandable member, and galvanic means disposed for introduction into said expandable member to react with the electrolyte therein and generate a gas whereby the internal pressure of said gas expands the volume of said expandable member thereby expelling lubricant from the outlet of said container, said galvanic means including a pair of dissimilar material elements conductively connected to each other to define a negative and a positive electrode respectively, and means for selectively positioning said negative and positive electrodes in contact with said electrolyte for gas generating reaction therewith.

2. The lubricator according to claim 1 wherein said selectively positioning means includes means defining a sealable housing for enclosing said galvanic means, an externally operable screw means disposed in operative engagement with said housing for selectively sealing same to inhibit gas generating reactive contact between said electrodes and said electrolyte, and for selectively positioning said electrodes for gas generating reactive contact with said electrolyte whereby the pressure of said gas and hence the effective volume of said expandable member can be regulated to effect a selected lubricant dispensing rate.

3. The lubricator according to claim 1 wherein said selectively positioning means includes means defining a sealable housing for enclosing said electrodes, an externally operable screw means disposed in operative engagement with said housing for selectively sealing same to inhibit gas generating reactive contact between said electrodes and said electrolyte, and for ejecting said electrodes from said housing into said electrolyte for gas generating reaction therewith whereby the effective volume of said expandable member can be increased to effect a corresponding lubricant dispensing rate.

4. A lubricator which comprises a lubricant supply container including an outlet for dispensing lubricant therefrom, an expandable member disposed within said container for volumetric expansion therein to expel lubricant through the outlet thereof, a sealable housing disposed within the volume enclosed between said expandable member and said container, an electrolyte disposed within said volume enclosed by said expandable member, a plurality of galvanic elements, each containing materials defining a positive electrode and a negative electrode, disposed within said sealable housing, an externally operable screw means disposed in operative engagement with said housing for selectively sealing same to inhibit gas generating reactive contact between said galvanic elements and said electrolyte, and with said galvanic elements for ejecting same from said housing into said electrolyte for gas generating reactive contact therewith whereby the effective volume of said expandable member can be increased to effect the expulsion of lubricant from the outlet of said container.

5. A lubricator which comprises a support housing for enclosing a replaceable cartridge, adapted to contain a lubricant supply, said housing including outlet for dispensing lubricant therefrom, said cartridge including an exterior shell for containing the lubricant, an expandable member disposed within said shell for volumetric expansion therein in contact with the lubricant to expel said lubricant under pressure therefrom and out through said dispensing outlet, and galvanically activated gas-generating means including an electrolyte and a galvanic element in contact with said electrolyte disposed within said expandable member for generating a gas under pressure therein whereby the effective volume of said expandable member is increased to dispense said lubricant, said galvanic element including dissimilar materials constituting a positive electrode and a negative electrode.

6. The lubricator according to claim 5 wherein said forward portion of the cartridge shell is adapted to contain lubricant and the expandable member and said gas generating means are disposed to occupy the remaining rearward portion of said shell.

7. The lubricator according to claim 5 wherein the rear end of said cartridge shell is closed by a cap member having an inner peripheral lip disposed in continuous sealing engagement with a corresponding peripheral edge portion of said expandable member whereby the gases generated by said gas generating means are confined within the volume enclosed by said expandable member and said cap member.

8. The lubricator according to claim 5 wherein said galvanically activated gas generating means includes a sealable housing disposed for communication with the interior of said expandable member, said galvanic element being disposed within said sealable housing, an externally operable screw means disposed for extension into said housing and for operative engagement with said galvanic element to introduce same into reactive contact with said electrolyte to generate a gas.

9. The lubricator according to claim 5 wherein said galvanically activated gas generating means includes, a sealable housing disposed for communication with the interior of said expandable member, a plurality of galvanic elements disposed within said sealable housing, an externally operable screw means disposed for extension into said housing and for operative engagement with said galvanic elements to selectively introduce said galvanic elements, one at a time in succession into reactive contact with said electrolyte to generate a gas.

10. The lubricator according to claim 5 wherein said galvanically activated gas generating means includes, a plurality of sealable housings disposed for communication with the interior of said expandable member, a galvanic element disposed within each of said housings, and a similar plurality of externally operable screw means, each of said screw means being disposed for extension into a corresponding housing and for operative engagement with the galvanic element therein to selectively introduce said individual galvanic elements ino reactive contact with said electrolyte to generate a gas.

11. The lubricator according to claim 5 wherein the negative electrode of said galvanic element is S-shaped and is connected in symmetrical relation to the positive electrode.

12. An apparatus for supplying a lubricant under pressure, which comprises a container means adapted to hold a quantity of lubricant and having an outlet for dispensing such lubricant, an expandable member disposed within said container for volumetric expansion in contact with the lubricant, an electrolyte disposed within said expandable member, and a galvanic element having a positive electrode and a negative electrode disposed within said expandable member for reactive contact with said electrolyte to generate a gas exerting an internal pressure upon said expandable member and volumetrically expanding same to displace the lubricant under pressure and through said container means outlet.

References Cited

UNITED STATES PATENTS 2,852,098  9/1958  Benson _____ 184—39
3,214,067  10/1965  Lenington _____ 222—389 X SAMUEL ROTHBERG, *Primary Examiner.*

E. J. EARLS, *Assistant Examiner.*

U.S. Cl. X.R.

222—386.5, 389; 239—323

UNITED STATES PATENT OFFICE
CERTIFICATE OF CORRECTION

Patent No. 3,430,731                                          March 4, 1969

Gebhard Satzinger

It is certified that error appears in the above identified patent and that said Letters Patent are hereby corrected as shown below:

Column 4, line 70, "dispensing of lubricant" should read -- lubricant dispensing rate --. Column 8, line 72, cancel "dissimilar".

Signed and sealed this 31st day of March 1970.

(SEAL)
Attest:

Edward M. Fletcher, Jr.                          WILLIAM E. SCHUYLER, JR.
Attesting Officer                                      Commissioner of Patents

Disclaimer 3,430,731.—*Gebhard Satzinger*, Bad Kissingen, Germany. LUBRICATOR. Patent dated Mar. 4, 1969. Disclaimer filed Feb. 2, 1984, by the assignee, *Gebhard Satzinger Metallwarenfabrik*, Bad Kissingen, Germany.

Hereby enters this disclaimer to all claims of said patent.
[*Official Gazette April 10, 1984.*]